United States Patent [19]

Schönenberger

[11] Patent Number: 5,470,293
[45] Date of Patent: Nov. 28, 1995

[54] TOOTHED-BELT, V-BELT, AND PULLEY ASSEMBLY, FOR TREADMILLS

[75] Inventor: Willi Schönenberger, Schönenberg, Switzerland

[73] Assignee: Woodway AG, Munich, Germany

[21] Appl. No.: 366,369

[22] Filed: Dec. 29, 1994

Related U.S. Application Data

[63] Continuation of Ser. No. 152,177, Nov. 12, 1993, abandoned.

[30] Foreign Application Priority Data

Nov. 12, 1992 [DE] Germany ............... 42 38 252.1

[51] Int. Cl.⁶ .................................................. A63B 22/02
[52] U.S. Cl. ................................. 482/54; 198/834
[58] Field of Search ................... 482/54; 198/834; 474/205, 152

[56] References Cited

U.S. PATENT DOCUMENTS 4,998,906  3/1991  Moss ........................................ 474/205

FOREIGN PATENT DOCUMENTS

| | | |
|---|---|---|
| 718485 | 1/1932 | France . |
| 1650657 | 11/1970 | Germany . |
| 2609043 | 9/1977 | Germany . |
| 2503118B2 | 1/1978 | Germany ............ A63B 23/06 |
| 0364992A2 | 10/1989 | Germany . |
| 3835979.1 | 4/1990 | Germany . |
| 885427 | 12/1961 | United Kingdom . |
| 2152825 | 8/1985 | United Kingdom ............ 482/54 |

*Primary Examiner*—Lynne A. Reichard
*Attorney, Agent, or Firm*—Seed and Berry

[57] ABSTRACT

The present invention refers to a toothed-belt and V-belt for treadmills, comprising an endless belt, which is provided with a plurality of tread lamellae and which is guided around two deflection pulleys. At least one of the deflection pulleys comprises a sliding disk member and a toothed-disk member in juxtaposition, and the belt comprises, in juxtaposition, a toothed-belt area associated with the toothed-disk member of the deflection pulley and a V-belt area abutting on the sliding disk member of the deflection pulley. The main force for driving the belt is transmitted via the sliding disk member and the V-belt area. The toothed-disk member of the deflection pulley preferably has toothed areas and toothless areas, which are alternately and equidistantly arranged throughout the circumferential surface thereof.

9 Claims, 2 Drawing Sheets

TOOTHED-BELT, V-BELT, AND PULLEY ASSEMBLY, FOR TREADMILLS

CROSS-REFERENCE TO RELATED APPLICATION

This application is a continuation of U.S. patent application Ser. No. 08/152,177, filed Nov. 12, 1993, now abandoned.

TECHNICAL FIELD

The present invention refers to a toothed-belt and V-belt means for treadmills, comprising at least one endless belt, which is provided with a plurality of tread lamellae and which is guided around two deflection pulleys arranged one behind the other.

BACKGROUND OF THE INVENTION

German-patent 25 03 118 already discloses a toothed-belt and V-belt means in the case of which a toothed-belt provided with tread lamellae is guided around two deflection pulleys and in the case of which two V-belts run around a plurality of support pulleys. Such a known means is shown in FIG. 4. Whereas the driving force of a motor connected to one of the deflection pulleys is transmitted from one deflection pulley 20 to the other via the toothed-belt 21, the V-belt 22 is entrained around the deflection means only passively, i.e., without any transmitting force, said V-belt serving only as an additional support of the tread lamellae 23. Hence, the toothed-belt and the V-belt are separately arranged means having different functions.

Especially due to the two separate belt means, the production of this known system is complicated and it entails high costs, said known system necessitating also timeconsuming maintenance. Furthermore, the force transmission by means of toothed-belts and deflection pulleys generates an unpleasantly loud noise, which is felt to be very annoying.

The present invention is based on the task of overcoming the disadvantages occurring in connection with the known toothed-belt and V-belt and, especially, on the task of improving said known means in such a way that it will run as silently as possible.

SUMMARY OF THE INVENTION

In accordance with the present invention, this task is solved by the features that at least one of the deflection pulleys comprises a sliding disk member and a toothed-disk member in juxtaposition, and that the belt comprises, in juxtaposition, toothed-belt area associated with the toothed-disk member of the deflection pulley and a V-belt area abutting on the sliding disk member of the deflection pulley, the main force for driving said belt being adapted to be transmitted via said sliding disk member and said V-belt area.

The present invention aims at transmitting the main force, which is used for driving the belt and the deflection pulley, via the quiet V-belt, instead of transmitting it via the toothed-belt as has hitherto been the case. The toothed-belt fulfills the function of guaranteeing that the endless, moving belt will neither tilt nor escape to the side. In the case of the toothed-belt/V-belt means according to the present invention only a single belt is used, which comprises toothed-belt areas and V-belt areas in combination. The generation of noise can directly be influenced through the dimensioning if the individual areas, i.e., the smaller the toothed-belt area the less noise will be generated.

The production of the means according to the present invention is economy-priced and time-saving, since the amount of material and work required is substantially reduced. In additions, the individual components of the means according to the present invention can easily be replaced and serviced so that, when maintenance work is to be carried out, the down times of a treadmill will be minimized.

In order to prevent the belt from tilting or from escaping to the side, it will suffice to provide only one deflection pulley which comprises toothed-disk members and sliding disk members, whereas the other deflection pulley is formed by a sliding disk, the deflection pulley comprising said toothed disk member and said sliding disk member being adapted to be driven by a motor.

This embodiment is particularly quiet, and it drastically reduces the costs for material and production.

In accordance with another preferred embodiment of the present invention, the following features can be provided: that the toothed-disk member of the deflection pulley includes toothed areas and toothless areas, which are alternately and equidistantly arranged throughout the circumferential surface thereof, said toothed areas being defined by a plurality of teeth.

This embodiment guarantees a further reduction of the noise generated, since the situation will not longer be such that each individual tooth of the toothed-belt is in engagement with a complementary pair of teeth on the toothed-disk member.

An additional preferred embodiment of the present invention can provide the features that the length of a toothless area of the toothed-disk member in the circumferential direction of the deflection pulley corresponds to half the length of a toothed-area in the circumferential direction of the deflection pulley.

In this connection, it turned out to be advantageous, when one toothed area comprises four individual juxtaposed teeth in the circumferential direction, and when the toothless area corresponds to the length of two juxtaposed teeth.

By means of these dimensions of the toothed areas and of the toothless areas, the noise generated can be reduced approximately by half, since only half of the individual teeth provided on the toothed-belt will be engaged by a complementary pair of teeth on the toothed-disk member. The toothed areas still provided on the toothed-disk member guarantee that the belt will neither tilt nor escape to the side.

An additional embodiment comprises the features that the associated teeth of the toothed belt area and of the toothed disk member are dimensioned such that, when the system is in operation, only one flank of each tooth is in engagement with one flank of the associated tooth.

In view of the fact that the main force of the means according to the present invention is transmitted via the V-belt area, it will suffice when only the flanks of the associated teeth are in contact with one another so as to guarantee that the endless, moving belt will neither tilt nor escape to the side. This embodiment especially serves to reduce the noise generated, since said noise is especially caused by the contacting portions of the teeth.

Finally, the provision of a circumferential groove in the surface of the toothed-disk member turned out to be expedient, the teeth of the toothed-disk member being out of contact with the toothed-belt area in said circumferential groove.

This embodiment, too, serves to decrease the generation of noise still further by reducing the toothed-disk member provided with teeth. The formation of two toothed-disk members, which are juxtaposed in parallel and which are separated by a circumferential groove, also guarantees that the belt will run regularly over the deflection pulleys.

BRIEF DESCRIPTION OF THE DRAWINGS

In the following, the present invention will be described in detail on the basis of embodiments and with reference to the drawing in which.

DETAILED DESCRIPTION OF THE INVENTION

Figure 1:
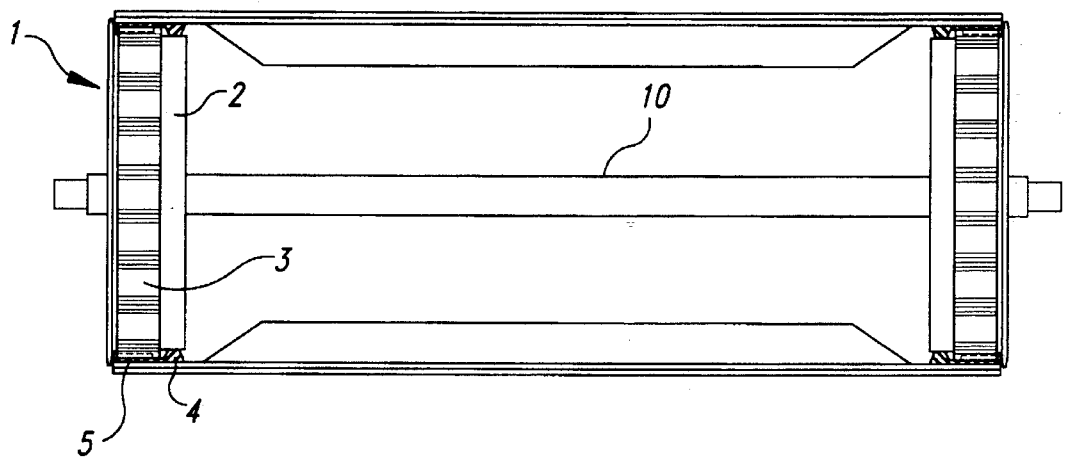
FIG. 1 shows a top view of a shaft having two deflection pulleys secured thereto.

The deflection pulley shaft 10, which is shown in FIG. 1, is provided with a deflection pulley 1 at each of its outer ends. Each of said deflection pulleys 1 is defined by a toothed-disk member 3 and by a sliding disk member 2, which is arranged at the side of the toothed-disk member such that it abuts thereon, and is attached to the shaft in such a way that the toothed-disk member 3 of each deflection pulley is located adjacent the outer ends of said shaft. It follows that the circular areas of the sliding disk members 2 of the deflection pulleys 1 interconnected by the shaft 10 are arranged in parallel opposed relationship with each other.

The circumferential surface of the toothed-disk member 3 is provided with juxtaposed teeth; each individual one of said teeth extends over the width of said circumferential surface. The teeth are preferably constructed as involute teeth. The circumferential surface of the sliding disk is smooth, the diameter of the sliding disk being preferably slightly smaller than the root diameter of the toothed-disk member 3, i.e., the diameter defined by the areas between the frustums of the teeth.

An endless belt is wound around each of the circumferential surfaces of said deflection pulleys, the inner side of said belt being provided with a toothed belt area 5, which is equipped with teeth and a V-belt area 4 in juxtaposition. The dimensions and the arrangement of the toothed belt and V-belt members is chosen in accordance with the dimensions and the arrangement of the toothed-disk and sliding disk members, i.e., the toothed-belt area 5 associated with the toothed-disk member 3 abuts on the outer end of the deflection pulley and has the same width as the toothed-disk member 3, and, accordingly, the V-belt area 4 is positioned on the sliding disk member 2 and its size corresponds approximately to that of the sliding disk member 2.

Figure 3:
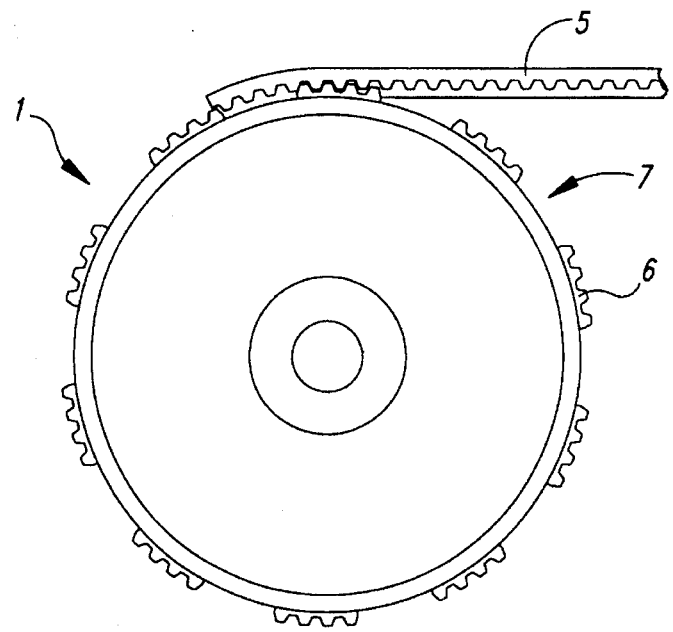
FIG. 3 shows a side view of a deflection pulley with a toothed-belt/V-belt according to one embodiment of the present invention.
Figure 4:
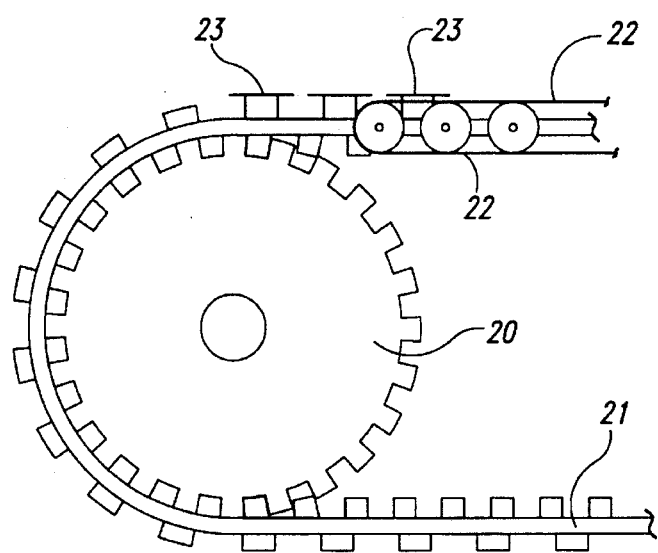
FIG. 4 shows a side view of prior art having a deflection pulley with belts and support pulleys arranged in a conventioned manner.

The toothed-disk member 3 preferably has the structural design shown in FIG. 3, i.e., not the whole circumferential surface of the toothed disk member is equipped with teeth, but toothed areas 6 and toothless areas 7 are provided, which are equidistantly and alternately arranged throughout the circumferential surface. The toothless areas 7 are preferably deeper that the root diameter of the toothing for preventing thus a contact between the individual teeth of the toothed-belt area and the resultant wear, etc. It turned out that the noise generated when these deflection pulleys are in operation is mainly due to the fact that the teeth of the toothed-belt and those of the toothed-disk member are brought into engagement with one another. The formation of toothless areas results in a substantial reduction of the engagement area of the toothed-belt, which is provided with a continuous toothing.

When the system is in operation, two of said shafts, which are provided with deflection pulleys, are arranged parallel to one another; preferably, only one deflection pulley having a structural design according to the present invention is used, e.g., on shaft 10, whereas the other shaft is only provided with sliding disks as deflection pulleys, said sliding disks being attached to the outer ends of said shaft. In this case, each belt is running around at least one deflection pulley constructed in accordance with the present invention, one of the deflection pulleys being e.g., arranged at the front and the other one at the back. An endless toothed V-belt is guided round each of said deflection pulley pairs. The shaft 10 provided with the deflection pulley 1, which is constructed in accordance with the present invention, is driven by a motor or by some other driving means which is not shown in the drawing. The driving force transmitted to the deflection pulley shaft 10 is transmitted to the second deflection pulley via the sliding disk member 2 and the V-belt area 4 contacting said sliding disk member 2 in a tensioned condition; the toothed belt area 5 has the function of preventing the belt from tilting or from escaping to the side. At the same time tread lamellae 9, which are secured to the deflection pulleys preferably in the areas of the toothed-disk members 3, are set in motion together with the belts so that a person standing on said tread lamellae has to carry out either a walking or a running movement in order to remain where he is, since otherwise he will be transported from one location to a different one. The upper surface of said tread lamellae is preferably provided with a shock-reducing coating, e.g., a rubber layer 8, which will cushion the step and result in a pleasant step contact.

The V-belt/toothed-belt means according to the present invention is characterized by a particularly noiseless mode of operation as well as by a running belt running in a particular quiet and regular manner. In accordance with an additional embodiment, which is not shown, the area of the toothed-disk member provided with teeth can be reduced still further, if said toothed-disk member 3 has centrally formed therein a circumferential groove. The toothed-disk member is then formed by two parallel circumferential areas provided with teeth or rather with toothed areas and toothless areas; these circumferential areas are separated by a toothless circumferential groove, one of said circumferential areas being located adjacent to the outer rim of the toothed-disk member and the other one bordering on the sliding disk member. The circumferential groove can be located on one level with the toothless areas or it can be formed on a lower level.

The circumferential groove can, for example, be used for accommodating therein the fastening means of the tread lamellae attached to the toothed-belt area.

Figure 2:
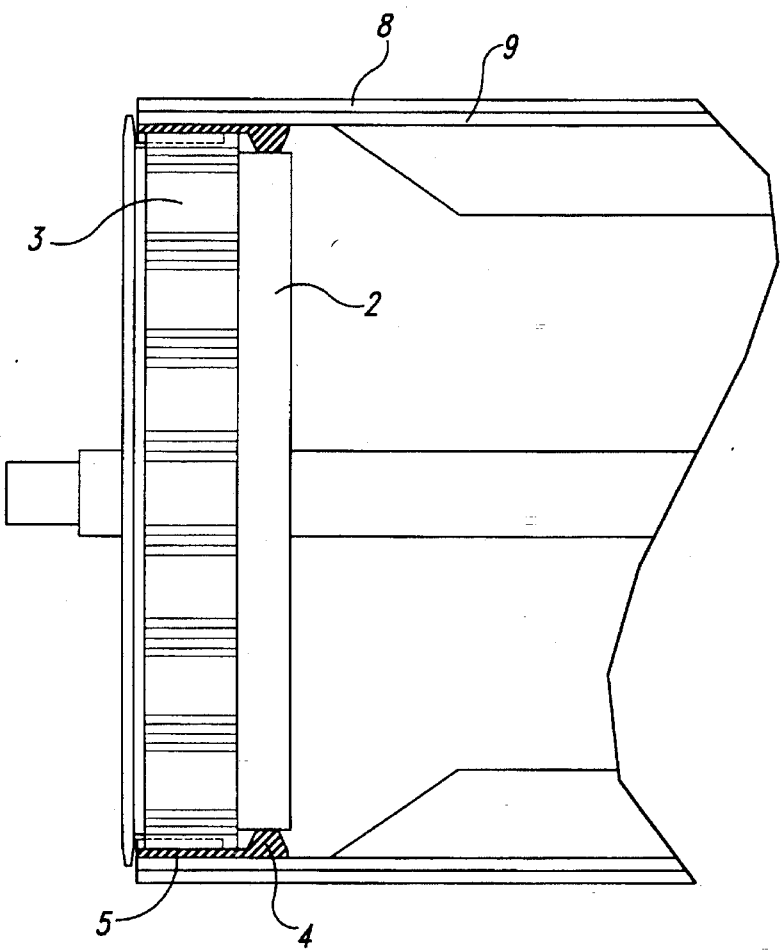
FIG. 2 shows a detail of one of the deflection pulleys shown in FIG. 1.

In accordance with an additional preferred embodiment shown in FIG. 2, the teeth of the toothed-belt area 5 and of the toothed-disk member 3 are dimensioned such that, when the system is in operation, the associated teeth of said toothed-belt member 5 and of said toothed-disk member 3 are in engagement with one another only in the area of a flank of the associated teeth. Between the remaining areas of the associated teeth, an air gap of preferably 0.5 mm is provided. This dimensioning is possible in view of the fact that the main force is transmitted via the V-belt area and the sliding disk member, whereas the toothed-belt area and the toothed- disk member only guarantee that the endless, moving belt will neither tilt nor escape to the side. The noise caused by the teeth which are in engagement with one another will thus be reduced drastically.

The belt according to the present invention is produced from conventional materials having preferably embedded therein steel wires in the circumferential direction. The belt can be produced either as an integral part or as a bipartite part; in this case, the two parts will have to be interconnected subsequently.

The toothed-disk and sliding disk member can be produced as an integral part or as two parts, which are produced separately and which are then interconnected in a further operational step. The production of the toothed-disk and of the sliding disk member as two separate workpieces provides, if the part wears out, the possibility of replacing only one of said parts later on, or of changing the dimensions of the individual parts later on.

I claim:

1. An assembly for treadmills, comprising at least one endless belt, which is provided with a plurality of tread lamellae and which is guided around two deflection pulleys arranged one behind the other, characterized in that at least one of said deflection pulleys comprises a sliding disk member and a toothed-disk member coaxially aligned and in juxtaposition, and that the belt comprises, in juxtaposition, a toothed belt area associated with the toothed-disk member of the deflection pulley and a V-belt area abutting on the sliding disk member of the deflection pulley, the main force for driving said belt being adapted to be transmitted via said sliding disk member and said V-belt area.

2. An assembly according to claim 1, characterized in that a first of the deflection pulleys comprises the sliding disk member and the toothed-disk member, and that a second of the deflection pulley's is formed by a sliding disk, said first deflection pulley being adapted to be driven by a driving device.

3. An assembly according to claim 1 or 2, characterized in that the toothed disk member of the deflection pulley includes toothed areas and toothless areas, which are alternately and equidistantly arranged throughout the circumferential surface thereof, said toothed areas being defined by a plurality of teeth.

4. An assembly according to claim 3, characterized in that the length of a toothless area of the toothed-disk member in the circumferential direction of said first deflection pulley corresponds to half the length of the toothed area in the circumferential direction of said first deflection pulley.

5. An assembly according to claim 3, characterized in that one toothed area comprises four juxtaposed teeth in the circumferential direction, and that the toothless area corresponds to the length of the juxtaposed teeth in the circumferential direction of said first deflection pulley.

6. An assembly according to claim 1 or 2, characterized in that the associated teeth of the toothed-belt area and of the toothed-disk member are dimensioned such that, when the system is in operation, only one flank of each tooth of the toothed belt area is in engagement with one flank of the associated tooth of the toothed-disk member.

7. An assembly according to claim 1 or 2, characterized in that the surface of the toothed disk member has formed therein a circumferential groove in which the teeth of the toothed disk member are out of contact with the toothed-belt area.

8. An assembly for treadmills, comprising at least one endless belt, which is provided with a plurality of tread lamellae and which is guided around two deflection pulleys arranged one behind the other characterized in that at least one of said deflection pulleys comprises a sliding disk member and a toothed-disk member coaxially mounted on a drive shaft and in juxtaposition, and that said at least one belt comprises, in juxtaposition, a toothed-belt area associated with said toothed-disk member of said deflection pulley and a V-belt area abutting on said sliding disk member of said deflection pulley, the main force for driving said at least one endless belt being adapted to be transmitted via said sliding disk member and said V-belt area.

9. An assembly according to claim 8 wherein said at least one of said deflection pulleys include a sliding disk member and a toothed-disk member integral with each other.

\* \* \* \* \*

UNITED STATES PATENT AND TRADEMARK OFFICE
CERTIFICATE OF CORRECTION

PATENT NO.    : 5,470,293
DATED         : November 28, 1995
INVENTOR(S)   : Willi Schonenberger It is certified that error appears in the above-indentified patent and that said Letters Patent is hereby corrected as shown below:

Title page, item [54] and col. 1. line 2,
In the title, after "Assembly" delete --,--.

In column 5, claim 2, line 41, delete "pulley's" and insert therefor --pulleys--.

Signed and Sealed this

Twenty-second Day of October, 1996

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,470,293
DATED : November 28, 1995
INVENTOR(S) : Willi Schönenberger It is certified that error appears in the above-indentified patent and that said Letters Patent is hereby corrected as shown below:

On the title page, item

[73], delete "Munich, Germany" and insert therefor --Neuchatel, Switzerland--.

Signed and Sealed this

Eighteenth Day of February, 1997

Attest:

BRUCE LEHMAN

*Attesting Officer*    *Commissioner of Patents and Trademarks*